US009785476B2

(12) United States Patent (10) Patent No.: US 9,785,476 B2
Wagner et al. (45) Date of Patent: Oct. 10, 2017

(54) ENDPOINT MANAGEMENT SYSTEM AND VIRTUAL COMPUTE SYSTEM

(71) Applicant: Amazon Technologies, Inc., Seattle, WA (US)

(72) Inventors: Timothy Allen Wagner, Seattle, WA (US); Jonathan Paul Thompson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 120 days.

(21) Appl. No.: 14/682,046

(22) Filed: Apr. 8, 2015

(65) Prior Publication Data

US 2016/0299790 A1 Oct. 13, 2016

(51) Int. Cl.
*G06F 11/00* (2006.01)
*G06F 9/50* (2006.01)
(Continued)

(52) U.S. Cl.
CPC ........ *G06F 9/5055* (2013.01); *G06F 9/45533* (2013.01); *G06F 9/5072* (2013.01);
(Continued)

(58) Field of Classification Search
CPC ............... G06F 9/5055; G06F 9/45533; G06F 11/1484; G06F 9/54; G06F 2009/45575;
(Continued)

(56) References Cited

U.S. PATENT DOCUMENTS 5,283,888 A 2/1994 Dao et al.
5,970,488 A 10/1999 Crowe et al.
(Continued)

FOREIGN PATENT DOCUMENTS

EP 2663052 A1 11/2013
WO WO 2009/137567 A1 11/2009
(Continued)

OTHER PUBLICATIONS

Adapter Pattern, Wikipedia, https://en.wikipedia.org/w/index.php?title=Adapter_pattern&oldid=654971255, [retrieved May 26, 2016], 6 pages.
(Continued)

*Primary Examiner* — Yair Leibovich
(74) *Attorney, Agent, or Firm* — Knobbe, Martens, Olson & Bear, LLP

(57) ABSTRACT

A system for integrating an endpoint management system and a virtual compute system is provided. The system may be configured to receive a first request to execute a proxy application programming interface (API) associated with a first resource of a plurality of resources maintained by the endpoint management system, determine, based at least in part on the first request and the proxy API, an API mapping definition associated with the proxy API, output a second request to execute a program code on the virtual compute system based on the API mapping definition associated with the proxy API, wherein the second request contains information associated with the first resource, receive a first response from the virtual compute system, wherein the first response contains information regarding the first resource, and output a second response based on the first response received from the virtual compute system.

22 Claims, 5 Drawing Sheets

(51) Int. Cl.
*G06F 9/455* (2006.01)
*G06F 9/54* (2006.01)
*G06F 11/14* (2006.01)

(52) U.S. Cl.
CPC ............ *G06F 9/54* (2013.01); *G06F 11/1484* (2013.01); *G06F 2009/45575* (2013.01); *G06F 2201/815* (2013.01); *G06F 2209/501* (2013.01)

(58) Field of Classification Search
CPC ......... G06F 2201/815; G06F 2209/501; G06F 9/5072
USPC .......................................................... 714/39
See application file for complete search history.

(56) References Cited

U.S. PATENT DOCUMENTS

| | | |
|---|---|---|
| 6,708,276 B1 | 3/2004 | Yarsa et al. |
| 7,036,121 B1 | 4/2006 | Casabona et al. |
| 7,665,090 B1 | 2/2010 | Tormasov et al. |
| 7,707,579 B2 | 4/2010 | Rodriguez |
| 7,823,186 B2 | 10/2010 | Pouliot |
| 7,886,021 B2 | 2/2011 | Scheifler et al. |
| 8,010,990 B2 | 8/2011 | Ferguson et al. |
| 8,024,564 B2 | 9/2011 | Bassani et al. |
| 8,046,765 B2 | 10/2011 | Cherkasova et al. |
| 8,065,676 B1 | 11/2011 | Sahai et al. |
| 8,095,931 B1 | 1/2012 | Chen et al. |
| 8,146,073 B2 | 3/2012 | Sinha |
| 8,166,304 B2 | 4/2012 | Murase et al. |
| 8,171,473 B2 | 5/2012 | Lavin |
| 8,336,079 B2 | 12/2012 | Budko et al. |
| 8,429,282 B1 | 4/2013 | Ahuja |
| 8,448,165 B1 | 5/2013 | Conover |
| 8,725,702 B1 | 5/2014 | Raman et al. |
| 8,756,696 B1 * | 6/2014 | Miller .................... H04L 63/14 709/247 |
| 8,825,964 B1 | 9/2014 | Sopka et al. |
| 8,997,093 B2 | 3/2015 | Dimitrov |
| 9,027,087 B2 | 5/2015 | Ishaya et al. |
| 9,038,068 B2 | 5/2015 | Engle et al. |
| 9,092,837 B2 | 7/2015 | Bala et al. |
| 9,110,732 B1 | 8/2015 | Forschmiedt et al. |
| 9,146,764 B1 | 9/2015 | Wagner |
| 9,208,007 B2 | 12/2015 | Harper et al. |
| 9,323,556 B2 | 4/2016 | Wagner |
| 9,361,145 B1 | 6/2016 | Wilson et al. |
| 9,413,626 B2 | 8/2016 | Reque et al. |
| 9,436,555 B2 | 9/2016 | Dornemann et al. |
| 9,471,775 B1 | 10/2016 | Wagner et al. |
| 9,483,335 B1 | 11/2016 | Wagner et al. |
| 9,537,788 B2 | 1/2017 | Reque et al. |
| 2003/0084434 A1 | 5/2003 | Ren |
| 2004/0249947 A1 | 12/2004 | Novaes et al. |
| 2004/0268358 A1 | 12/2004 | Darling et al. |
| 2005/0044301 A1 | 2/2005 | Vasilevsky et al. |
| 2005/0132368 A1 | 6/2005 | Sexton et al. |
| 2005/0193283 A1 | 9/2005 | Reinhardt et al. |
| 2006/0248195 A1 | 11/2006 | Toumura et al. |
| 2007/0094396 A1 | 4/2007 | Takano et al. |
| 2007/0130341 A1 | 6/2007 | Ma |
| 2008/0028409 A1 | 1/2008 | Cherkasova et al. |
| 2008/0082977 A1 | 4/2008 | Araujo et al. |
| 2008/0104608 A1 | 5/2008 | Hyser et al. |
| 2008/0126110 A1 | 5/2008 | Haeberle et al. |
| 2008/0126486 A1 | 5/2008 | Heist |
| 2008/0189468 A1 | 8/2008 | Schmidt et al. |
| 2008/0201711 A1 | 8/2008 | Amir Husain |
| 2009/0025009 A1 | 1/2009 | Brunswig et al. |
| 2009/0055810 A1 | 2/2009 | Kondur |
| 2009/0077569 A1 | 3/2009 | Appleton et al. |
| 2009/0125902 A1 | 5/2009 | Ghosh et al. |
| 2009/0158275 A1 | 6/2009 | Wang et al. |
| 2009/0193410 A1 | 7/2009 | Arthursson et al. |
| 2009/0198769 A1 | 8/2009 | Keller et al. |
| 2009/0204964 A1 | 8/2009 | Foley et al. |
| 2009/0300599 A1 | 12/2009 | Piotrowski |
| 2010/0023940 A1 | 1/2010 | Iwamatsu et al. |
| 2010/0031274 A1 | 2/2010 | Sim-Tang |
| 2010/0031325 A1 | 2/2010 | Maigne et al. |
| 2010/0115098 A1 | 5/2010 | De Baer et al. |
| 2010/0122343 A1 | 5/2010 | Ghosh |
| 2010/0186011 A1 | 7/2010 | Magenheimer |
| 2010/0198972 A1 | 8/2010 | Umbehocker |
| 2010/0269109 A1 | 10/2010 | Cartales |
| 2011/0029970 A1 | 2/2011 | Arasaratnam |
| 2011/0055378 A1 | 3/2011 | Ferris et al. |
| 2011/0055396 A1 | 3/2011 | DeHaan |
| 2011/0099551 A1 | 4/2011 | Fahrig et al. |
| 2011/0134761 A1 | 6/2011 | Smith |
| 2011/0141124 A1 | 6/2011 | Halls et al. |
| 2011/0153838 A1 | 6/2011 | Belkine et al. |
| 2011/0184993 A1 | 7/2011 | Chawla et al. |
| 2011/0265164 A1 | 10/2011 | Lucovsky |
| 2012/0054744 A1 | 3/2012 | Singh et al. |
| 2012/0072914 A1 | 3/2012 | Ota |
| 2012/0096468 A1 | 4/2012 | Chakravorty et al. |
| 2012/0110155 A1 | 5/2012 | Adlung et al. |
| 2012/0110164 A1 | 5/2012 | Frey et al. |
| 2012/0110588 A1 | 5/2012 | Bieswanger et al. |
| 2012/0192184 A1 | 7/2012 | Burckart et al. |
| 2012/0197958 A1 | 8/2012 | Nightingale et al. |
| 2012/0233464 A1 | 9/2012 | Miller et al. |
| 2012/0331113 A1 | 12/2012 | Jain et al. |
| 2013/0042234 A1 | 2/2013 | DeLuca et al. |
| 2013/0054927 A1 | 2/2013 | Raj et al. |
| 2013/0097601 A1 | 4/2013 | Podvratnik et al. |
| 2013/0111469 A1 | 5/2013 | B et al. |
| 2013/0132942 A1 | 5/2013 | Wang |
| 2013/0151648 A1 | 6/2013 | Luna |
| 2013/0179574 A1 | 7/2013 | Calder et al. |
| 2013/0179894 A1 | 7/2013 | Calder et al. |
| 2013/0185729 A1 | 7/2013 | Vasic et al. |
| 2013/0191924 A1 | 7/2013 | Tedesco |
| 2013/0198319 A1 | 8/2013 | Shen et al. |
| 2013/0205092 A1 | 8/2013 | Roy et al. |
| 2013/0219390 A1 | 8/2013 | Lee et al. |
| 2013/0227641 A1 | 8/2013 | White et al. |
| 2013/0232480 A1 | 9/2013 | Winterfeldt et al. |
| 2013/0263117 A1 | 10/2013 | Konik et al. |
| 2013/0297964 A1 | 11/2013 | Hegdal et al. |
| 2013/0339950 A1 | 12/2013 | Ramarathinam et al. |
| 2013/0346946 A1 | 12/2013 | Pinnix |
| 2013/0346987 A1 | 12/2013 | Raney et al. |
| 2014/0007097 A1 | 1/2014 | Chin et al. |
| 2014/0019965 A1 | 1/2014 | Neuse et al. |
| 2014/0019966 A1 | 1/2014 | Neuse et al. |
| 2014/0040343 A1 | 2/2014 | Nickolov et al. |
| 2014/0040857 A1 | 2/2014 | Trinchini et al. |
| 2014/0059226 A1 | 2/2014 | Messerli et al. |
| 2014/0068611 A1 | 3/2014 | McGrath et al. |
| 2014/0082165 A1 | 3/2014 | Marr et al. |
| 2014/0101649 A1 | 4/2014 | Kamble et al. |
| 2014/0109087 A1 | 4/2014 | Jujare et al. |
| 2014/0109088 A1 | 4/2014 | Dournov et al. |
| 2014/0129667 A1 | 5/2014 | Ozawa |
| 2014/0130040 A1 | 5/2014 | Lemanski |
| 2014/0173614 A1 | 6/2014 | Konik et al. |
| 2014/0173616 A1 | 6/2014 | Bird et al. |
| 2014/0180862 A1 | 6/2014 | Certain et al. |
| 2014/0201735 A1 | 7/2014 | Kannan et al. |
| 2014/0215073 A1 | 7/2014 | Dow et al. |
| 2014/0245297 A1 | 8/2014 | Hackett |
| 2014/0279581 A1 | 9/2014 | Devereaux |
| 2014/0282615 A1 | 9/2014 | Cavage et al. |
| 2014/0289286 A1 | 9/2014 | Gusak |
| 2014/0304698 A1 | 10/2014 | Chigurapati et al. |
| 2014/0380085 A1 | 12/2014 | Rash et al. |
| 2015/0074659 A1 * | 3/2015 | Madsen .................... G06F 8/61 717/177 |
| 2015/0120928 A1 | 4/2015 | Gummaraju et al. |
| 2016/0072727 A1 | 3/2016 | Leafe et al. |
| 2016/0092250 A1 | 3/2016 | Wagner et al. |
| 2016/0092252 A1 | 3/2016 | Wagner |

(56) References Cited

U.S. PATENT DOCUMENTS

| | | |
|---|---|---|
| 2016/0098285 A1 | 4/2016 | Davis et al. |
| 2016/0224360 A1 | 8/2016 | Wagner et al. |
| 2016/0224785 A1 | 8/2016 | Wagner et al. |
| 2016/0239318 A1 | 8/2016 | Wagner |
| 2016/0301739 A1 | 10/2016 | Thompson |

FOREIGN PATENT DOCUMENTS

| | | | |
|---|---|---|---|
| WO | WO 2016/053950 A1 | 4/2016 | |
| WO | WO 2016/053968 A1 | 4/2016 | |
| WO | WO 2016/053973 A1 | 4/2016 | |
| WO | WO 2016/090292 A1 | 6/2016 | |
| WO | WO 2016/126731 A1 | 8/2016 | |
| WO | WO 2016/164633 A1 | 10/2016 | |
| WO | WO 2016/164638 A1 | 10/2016 | |

OTHER PUBLICATIONS

Czajkowski, G., and L. Daynes, Multitasking Without Compromise: A Virtual Machine Evolution 47(4a):60-73, ACM SIGPLAN Notices—Supplemental Issue, Apr. 2012.

Dombrowski, M., et al., Dynamic Monitor Allocation in the Java Virtual Machine, JTRES '13, Oct. 9-11, 2013, pp. 30-37.

Espadas, J., et al., A Tenant-Based Resource Allocation Model for Scaling Software-as-a-Service Applications Over Cloud Computing Infrastructures, Future Generation Computer Systems, vol. 29, pp. 273-286, 2013.

Nakajima, J., et al., Optimizing Virtual Machines Using Hybrid Virtualization, SAC '11, Mar. 21-25, 2011, TaiChung, Taiwan, pp. 573-578.

Qian, H., and D. Medhi, et al., Estimating Optimal Cost of Allocating Virtualized Resources With Dynamic Demand, ITC 2011, Sep. 2011, pp. 320-321.

Shim (computing), Wikipedia, https://en.wikipedia.org/w/index.php?title+Shim_(computing)&oldid+654971528, [retrieved on May 26, 2016], 2 pages.

Vaghani, S.B., Virtual Machine File System, ACM SIGOPS Operating Systems Review 44(4):57-70, Dec. 2010.

Vaquero, L., et al., Dynamically Scaling Applications in the cloud, ACM SIGCOMM Computer Communication Review 41(1):45-52, Jan. 2011.

Zheng, C., and D. Thain, Integrating Containers into Workflows: A Case Study Using Makeflow, Work Queue, and Docker, VTDC '15, Jun. 15, 2015, Portland, Oregon, pp. 31-38.

International Search Report and Written Opinion in PCT/US2015/052810 dated Dec. 17, 2015.

International Search Report and Written Opinion in PCT/US2015/052838 dated Dec. 18, 2015.

International Search Report and Written Opinion in PCT/US2015/052833 dated Jan. 13, 2016.

International Search Report and Written Opinion in PCT/US2015/064071dated Mar. 16, 2016.

International Search Report and Written Opinion in PCT/US2016/016211 dated Apr. 13, 2016.

International Search Report and Written Opinion in PCT/US2016/026514 dated Jun. 8, 2016.

International Search Report and Written Opinion in PCT/US2016/026520 dated Jul. 5, 2016.

International Search Report and Written Opinion in PCT/US2016/054774 dated Dec. 16, 2016.

* cited by examiner

ENDPOINT MANAGEMENT SYSTEM AND VIRTUAL COMPUTE SYSTEM

CROSS-REFERENCE TO OTHER APPLICATIONS

The present application's Applicant previously filed the following U.S. patent application on Sep. 30, 2014:
application Ser. No. 14/502,992 Title THREADING AS A SERVICE Further, the present application's Applicant is concurrently filing the following U.S. patent application on Apr. 8, 2015:
application Ser. No. 14/682,033 Title ENDPOINT MANAGEMENT SYSTEM PROVIDING AN APPLICATION PROGRAMMING INTERFACE PROXY SERVICE The disclosures of the above-referenced applications are hereby incorporated by reference in their entireties.

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some scenarios, virtual machine instances may be configured according to a number of virtual machine instance types to provide specific functionality. For example, various computing devices may be associated with different combinations of operating systems or operating system configurations, virtualized hardware resources and software applications to enable a computing device to provide different desired functionalities, or to provide similar functionalities more efficiently. These virtual machine instance type configurations are often contained within a device image, which includes static data containing the software (e.g., the OS and applications together with their configuration and data files, etc.) that the virtual machine will run once started. The device image is typically stored on the disk used to create or initialize the instance. Thus, a computing device may process the device image in order to implement the desired software configuration.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Figure 1:
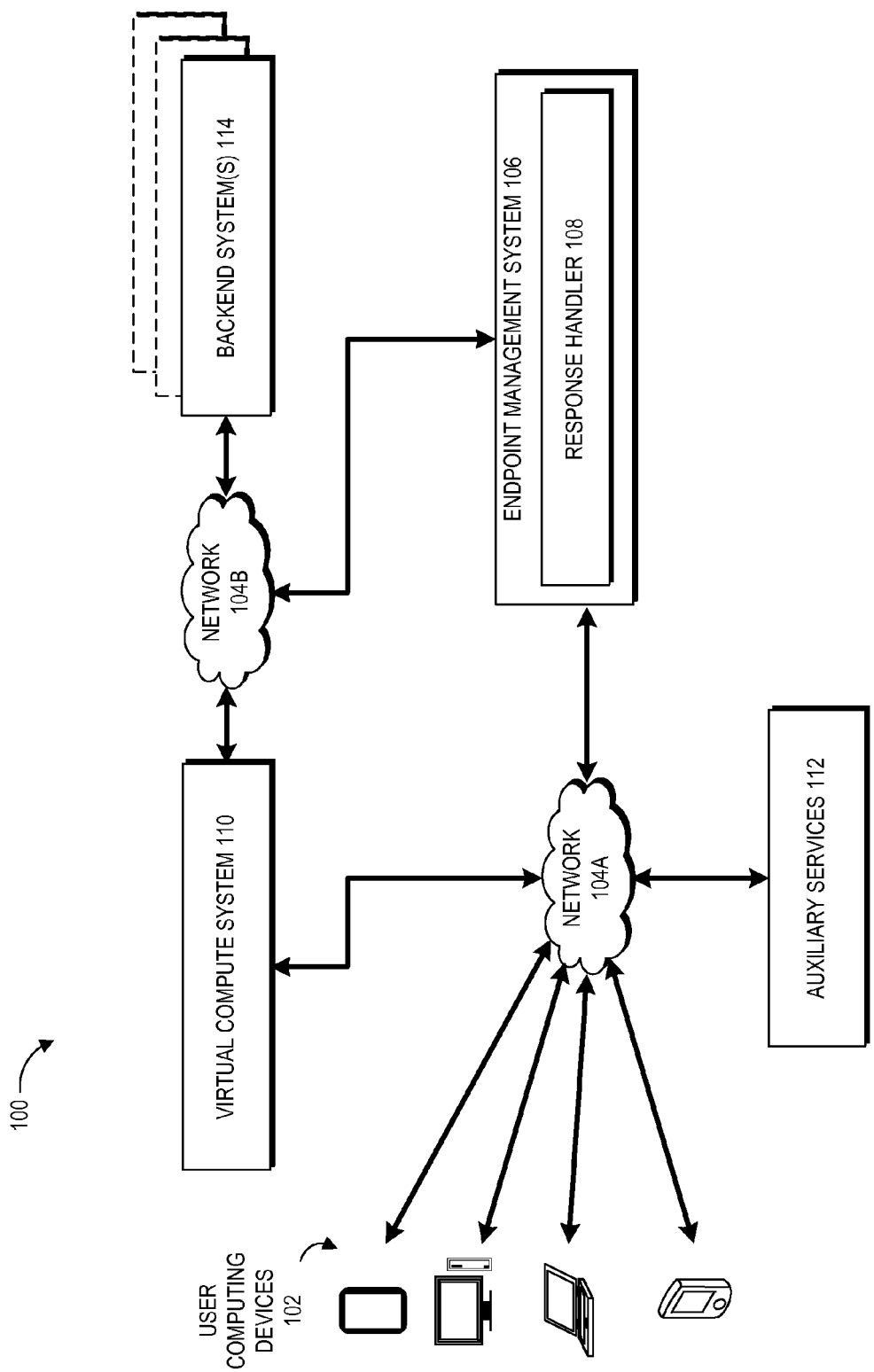
FIG. 1 is a block diagram depicting an illustrative environment for integrating an endpoint management system and a virtual compute system, according to an example aspect.

Enterprises may store and maintain customer data that includes information about all of their customers. In some cases, the customer data may be spread across multiple different data storage systems. In such cases, if the system receives a request to search the customer data for some information, the system would have to look in all of the different data storage systems holding the customer data for the requested information. The multiple data storage systems may include duplicative information, so before returning the requested customer data, the system may need to perform additional processing on the collection of customer data retrieved from multiple data storage systems (e.g., deduplicate, unify, etc.). The different data storage systems may have different protocols so each of those storage systems may involve generating a data request that is customized for the storage system. Further, the number of such data storage systems may vary depending on the size of the data being stored, and the system may need to access tens, hundreds, or even thousands of these data storage systems depending on the nature of the data request.

To address some of these problems, the enterprise may hire outside consultants to develop implementations that would satisfy the needs of the enterprise. However, such an approach may take weeks or months and also cost the enterprise a great deal of monetary expense.

Thus, an improved method of allowing users to perform a diversity of tasks in a relatively simple manner is desired.

According to aspects of the present disclosure, by integrating an endpoint management system and a virtual compute system configured to provide low-latency computational capacity and handle code execution requests, delay (sometimes referred to as latency) associated with handling user requests to the endpoint management system can be significantly reduced.

Generally described, aspects of the present disclosure relate to the integration between (i) an endpoint management system by which users, such as application developers, can manage and enable exposure of application programming interfaces ("APIs") usable to cause execution of program code on a remote or third party system, and (ii) a system for providing general compute capacity. Specifically, systems and methods are disclosed which facilitate integration between a virtual compute system that provides low-latency computational capacity and an endpoint management system that facilitates the handling of user requests to perform certain tasks by utilizing the services provided by the virtual compute system. The endpoint management system sends requests to execute program codes to the virtual compute system based on requests received from one or more user computing systems. Further, the endpoint management system generates responses back to the user computing systems based on the responses received from the virtual compute system.

Specific embodiments and example applications of the present disclosure will now be described with reference to the drawings. These embodiments and example applications are intended to illustrate, and not limit, the present disclosure.

Overview of the Computing Environment

With reference to FIG. 1, a block diagram illustrating an embodiment of a computing environment 100 will be described. The example shown in FIG. 1 includes a computing environment 100 in which users of user computing devices 102 may access a variety of services provided by an endpoint management system 106, a virtual compute system 110, auxiliary services 112, and backend system(s) 114 via a network 104A and/or a network 104B.

In the example of FIG. 1, various example user computing devices 102 are shown, including a desktop computer, a laptop, and a mobile phone. In general, the user computing devices 102 can be any computing device such as a desktop, a laptop, a mobile phone (or a smartphone), a tablet, a kiosk, a wireless device, and other electronic devices. In addition, the user computing devices 102 may include web services running on the same or different data centers, where, for example, different web services may programmatically communicate with each other to perform one or more techniques described herein. Further, the user computing devices 102 may include Internet of Things (IoT) devices such as Internet appliances and connected devices. Other components of the computing environment 100 (e.g., endpoint management system 106, virtual compute system 110, and auxiliary services 112) may provide the user computing devices 102 with one or more user interfaces, command-line interfaces (CLI), application programming interfaces (API), and/or other programmatic interfaces for utilizing one or more services offered by the respective components. Such services may include generating and uploading user codes, invoking the user codes (e.g., submitting a request to execute the user codes on the virtual compute system 110), configuring one or more APIs (e.g., via the endpoint management system 106), caching results of execution of user codes and APIs, and/or monitoring API call usage for security, performance, metering, and other factors, scheduling event-based jobs or timed jobs, tracking the user codes, and/or viewing other logging or monitoring information related to their requests and/or user codes. Although one or more embodiments may be described herein as using a user interface, it should be appreciated that such embodiments may, additionally or alternatively, use any CLIs, APIs, or other programmatic interfaces.

The user computing devices 102 access other components (e.g., endpoint management system 106, virtual compute system 110, and auxiliary services 112) of the computing environment 100 over the network 104A. The endpoint management system 106 may comprise one or more servers or system (e.g., a proxy fleet) which may be configured to manage execution of endpoint or backend APIs (e.g., as executed on the virtual compute system 110 or the backend system(s) 114). The endpoint management system 106 may access other components of the computing environment 100, such as the virtual compute system 110 or the backend system(s) 114 over the network 104B. The networks 104A and/or 104B may be any wired network, wireless network, or combination thereof. In addition, the networks 104A and/or 104B may be a personal area network, local area network, wide area network, over-the-air broadcast network (e.g., for radio or television), cable network, satellite network, cellular telephone network, or combination thereof. For example, the network 104A and/or 104B may be a publicly accessible network of linked networks, possibly operated by various distinct parties, such as the Internet. In some embodiments, the network 104A and/or 104B may be a private or semi-private network, such as a corporate or university intranet, or a publicly accessible network such as the Internet. In one embodiment, the network 104B may be co-located or located in close proximity to the endpoint management system 106, such that communication over the network 104B between the endpoint management system 106 and backend system(s) 114 may benefit from increased performance (e.g., faster and/or more efficient communication). The network 104A and/or 104B may include one or more wireless networks, such as a Global System for Mobile Communications (GSM) network, a Code Division Multiple Access (CDMA) network, a Long Term Evolution (LTE) network, or any other type of wireless network. The network 104A and/or 104B can use protocols and components for communicating via the Internet or any of the other aforementioned types of networks. For example, the protocols used by the network 104A and/or 104B may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The endpoint management system 106 and the virtual compute system 110 are depicted in FIG. 1 as operating in a distributed computing environment including several computer systems that are interconnected using one or more computer networks. The endpoint management system 106 and/or the virtual compute system 110 could also operate within a computing environment having a fewer or greater number of devices than are illustrated in FIG. 1. Thus, the depiction of the computing environment 100 in FIG. 1 should be taken as illustrative and not limiting to the present disclosure. For example, the computing environment 100 or various constituents thereof could implement various Web services components, hosted or "cloud" computing environments, and/or peer-to-peer network configurations to implement at least a portion of the processes described herein.

Further, the various components of the computing environment 100 may be implemented in hardware and/or software and may, for instance, include one or more physical or virtual servers implemented on physical computer hardware configured to execute computer executable instructions for performing various features that will be described herein. The one or more servers may be geographically dispersed or geographically co-located, for instance, in one or more data centers.

In the example of FIG. 1, the endpoint management system 106 includes a response handler 108. The response handler 108 may be in communication with and access an endpoint/API mapping definitions data source (not shown) to look up API mapping definition for a received request. The response handler 108 can, based at least in part on the API mapping definition, determine a backend API (or APIs) and backend system(s) to be used to service the request. The response handler 108 may also be configured to parse and/or analyze requests received from the user computing systems 102 and/or responses received from the virtual compute system 110 or the backend system(s) 114, and determine based on the API mapping definition any appropriate data transformations and mappings of the associated input parameters to input parameters for a backend API or other program codes. The response handler 108 may include a request and response parsing unit for processing the response received from other systems in the computing environment 100, and a pattern matching unit for performing, based on the information extracted by the request and response parsing unit, a pattern matching using the definitions previously provided to the endpoint management system 106 by the user. An example configuration of the response handler 108 is described in greater detail below with reference to FIG. 2. Although not illustrated in FIG. 1, the endpoint management system 106 may include other components such as a cache manager for caching responses received from other systems in the computing environment 100, a security manager for managing security and access to other systems in the computing environment 100, a performance unit for managing performance related aspects involving requests sent to other systems in the computing environment 100, and a Software Developer Kit ("SDK") generation service for enabling users to generate an SDK based on one or more API mapping definitions (e.g., a user-provided configuration setting to specify a limit or frequency for how often an API may be called). In some embodiments, the endpoint management system 106 may comprise multiple systems (e.g., an endpoint management system for allowing users to configure one or more APIs and an endpoint proxy system for managing execution of endpoint or backend APIs on the virtual compute system 110 or the backend system(s) 114). In some of such embodiments, one or more components described herein as being part of the endpoint management system 106 (e.g., response handler 108) may logically reside in such an endpoint proxy system.

In the example of FIG. 1, the management system 106 is illustrated as being connected to the network 104A and the network 104B. In some embodiments, any of the components within the endpoint management system 106 can communicate with other components (e.g., the user computing devices 102 and backend system(s) 114) of the computing environment 100 via the network 104A and/or network 104B. In other embodiments, not all components of the endpoint management system 106 are capable of communicating with other components of the computing environment 100. In one example, only the response handler 108 may be connected to the network 104A, and other components (e.g., cache manager, performance unit, etc.) of the endpoint management system 106 may communicate with other components of the computing environment 100 via the response handler 108.

The virtual compute system 110 maintains a pool of virtual machine instances that have one or more software components (e.g., operating systems, language runtimes, libraries, etc.) loaded thereon. Maintaining the pool of virtual machine instances may involve creating a new instance, acquiring a new instance from an external instance provisioning service, destroying an instance, assigning/re-assigning an instance to a user, modifying an instance (e.g., containers or resources therein), etc. The virtual machine instances in the pool can be designated to service user requests to execute program codes. In the present disclosure, the phrases "program code," "user code," and "cloud function" may sometimes be interchangeably used. The program codes can be executed in isolated containers that are created on the virtual machine instances. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) is significantly reduced.

Although not illustrated in the example environment of FIG. 1, the virtual compute system 110 may include a frontend, a warming pool manager, a worker manager, and other components that collectively provide low-latency computational capacity to other systems in the computing environment 100. The warming pool manager and the worker manager may each manage a pool of virtual machine instances ("instances") (e.g., a warming pool and an active pool, respectively). The instances can be implemented on one or more physical computing devices in different various geographic regions. Similarly, each of the frontend, the warming pool manager, the worker manager, and other components of the virtual compute system 110 can be implemented across multiple physical computing devices. Alternatively, one or more of the frontend, the warming pool manager, the worker manager, and other components of the virtual compute system 110 can be implemented on a single physical computing device. In some embodiments, the virtual compute system 110 may comprise multiple frontends, multiple warming pool managers, multiple worker managers, and/or other components. The virtual compute system 110 may comprise any number of warming pools and active pools.

In the example of FIG. 1, the virtual compute system 110 is illustrated as being connected to the network 104A and the network 104B. In some embodiments, any of the components within the virtual compute system 110 can communicate with other components (e.g., the user computing devices 102 and auxiliary services 112) of the computing environment 100 via the network 104A and/or 104B. In other embodiments, not all components of the virtual compute system 110 are capable of communicating with other components of the computing environment 100. In one example, only the frontend may be connected to the network 104A and/or 104B, and other components of the virtual compute system 110 may communicate with other components of the computing environment 100 via the frontend.

The virtual compute system 110 may be configured to handle requests to execute one or more program codes on the virtual compute system 110. For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. Alternatively, the user may send a code execution request to the virtual compute system 110. Similarly, the endpoint management system 106 may send a request to the virtual compute system 110 to execute some program codes associated with a request received from a user of the user computing device 102. The virtual compute system 110 can handle the acquisition and configuration of compute capacity (e.g., containers, instances, etc., which are described in greater detail below) based on the code execution request, and execute the code using the compute capacity. The virtual compute system 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus overpaying). Additional details of the virtual compute system 110 can be found in application Ser. No. 14/502,992, filed Sep. 30, 2014, titled "THREADING AS A SERVICE," which is incorporated by reference in its entirety.

The auxiliary services 112 may include a monitoring service for managing monitoring information received from the virtual compute system 110, such as statuses of containers and instances on the virtual compute system 110; a logging service for managing logging information received from the virtual compute system 110, such as activities performed by containers and instances on the virtual compute system 110; and a billing service for generating billing information associated with executing user code on the virtual compute system 110 (e.g., based on the monitoring information and/or the logging information managed by the monitoring service and the logging service).

The backend system(s) 114 may include legacy systems that have protocols that are not compatible with those of the user computing devices 102 or otherwise not easily accessible by the user computing devices 102. The backend system(s) 114 may also include devices that have device-specific protocols (e.g., IoT devices).

Integration Between Endpoint Management System and Virtual Compute System

In some embodiments, the endpoint management system 106 receives a request to access one or more resources maintained by the endpoint management system 106 from a user of the user computing devices 102. Upon receiving such a request, the endpoint management system 106 may communicate with other components of the computing environment 100 in order to provide what was requested by the user. In some embodiments, the request may include an HTTP request that specifies the method and resource combination and one or more other parameters that may be used by the endpoint management system 106 in performing the requested task. For example, if the requested task is resizing an image that is provided along with the HTTP request, the endpoint management system 106 may relay that request to one of the other components (e.g., the virtual compute system 110) of the computing environment 100 that is suited to perform such a task. The endpoint management system 106 may provide to the virtual compute system 110 all the information necessary to perform the given task. For example, the endpoint management system 106 may provide to the virtual compute system 110 the image to be resized and specify the program code to be used to performing the resizing. In some embodiments, the endpoint management system 106 maintains a database containing a list of program codes that are associated with different combinations of user parameters, requested resources, methods, or any combinations thereof. For example, when a particular resource is accessed by the user (e.g., by using a resource identifier), the endpoint management system 106 may determine the program code to be used to perform the requested task based on the information stored in the database. In some embodiments, the endpoint management system 106 provides the location of the program code associated with the given task to the virtual compute system 110, and the virtual compute system 110 downloads the program code at the provided location and executes the program code to perform the given task (e.g., image resizing). Once the endpoint management system 106 hears back from the virtual compute system 110 and is provided with the resized image, the endpoint management system 106 may further provide the resized image to the user who initiated the original request.

In some embodiments, the request made to the virtual compute system 110 by the endpoint management system 106 results in an error. The error may be caused by the way the requested is made (e.g., from the user computing devices 102 to the endpoint management system 106 or from the endpoint management system 106 to the virtual compute system 110). In another example, the error may be caused by the way the program code is written (e.g., the program code may contain bugs). In yet another example, the error may be caused by a mishandling of the request by the virtual compute system 110 (e.g., computing resource automatically allocated to handle the request turned out to be too low). In any of these circumstances, the response handler 108 may determine whether or not there is an error, and further determine how to complete the original request by the user in view of the identified error.

The per-request scaling that the virtual compute system 110 provides may be lined up with the per-request API endpoints of the endpoint management system 106 to provide users the ability to change the code at any moment. For example, the virtual compute system 110 includes pre-warmed instances that can provide low-latency compute capacity, which allows the endpoint management system 106 to acquire new compute capacity without having to wait for an extended period of time (e.g., warmup time needed to get new capacity online, which could take minutes, during which API requests may be rejected or delayed). Further, the integration of the endpoint management system 106 with the virtual compute system 110 allows users to run arbitrary, Turing-complete code, and self-service change at any moment.

In some embodiments, the virtual compute system 110 may call back into the endpoint management system 106 access two or more enterprise systems in order to compose the results. The virtual compute system 110 may provide the custom transforms and higher-order function capability in this scenario, but the endpoint management system 106 may also add value by handling the throttling, authentication, telemetry, protocol conversion, etc. into the backend (or even on the premises) third-party enterprise services. For example, the coupling of the access, authentication, and other endpoint controls provided by the endpoint management system 106 with a low latency, request-scaled cloud compute capacity provided by the virtual compute system 110. The endpoint management system 106 provides customer-owned and managed HTTP[S] endpoints for program codes available to be executed on the virtual compute system 110, including vanity URLs, customer-controlled authorization mechanisms, public (HTTP versus HTTPS) and other "web app" features.

Error Handling

For example, the response handler 108 may have knowledge of the protocols used by the virtual compute system 110, and how function errors are transmitted back to the endpoint management system 106. For example, the response handler 108 may be able to determine, based on the response received from the virtual compute system 110, that the response handler 108 is communicating with the virtual compute system 110. Based on the determination that the response handler 108 is communicating with the virtual compute system 110, the response handler 108 can determine what to look for in the response from the virtual compute system 110. The response received from the virtual compute system 110 may include a message (e.g., generic description of the result) and a detail (e.g., stack trace). In some embodiments, the response handler 108 may determine a list of error messages based on the identity of the system that the response handler 108 is communicating with, and determine whether the request to the system has resulted in an error based on whether the response from the system contains any of the error messages in the list. If the response handler 108 determines that the request to the system (e.g., virtual compute system 110) has resulted in an error, the response handler 108 generates an error response back to the user who initiated the original request.

In some implementations, the response handler 108 uses a set of selectors that can be used to determine, based on the information in the response received from the virtual compute system 110, which response type should be provided back to the user. In the example of HTTP requests, the response back to the user may include a particular HTTP status code and a particular body. For example, the response handler 108 may transform a success response, which indicates that the execution on the virtual compute system 110 was a success, into a failure, and conversely, transform a failure response, which indicates that the execution on the virtual compute system 110 was a failure, into a success, before providing the response back to the caller. In one example, if the response handler 108 finds the word, "throttle" in the response from the virtual compute system 110, the response handler 108 may return a 4xx HTTP status code instead of a 5xx. In another example, if a response from the virtual compute system indicated that the program code successfully executed but the body of the response from the virtual compute system includes the phrase, "could not located database," the response handler 108 may transform the response into an error (e.g., 5xx status code instead of 2xx) before providing the response back to the caller. The response handler 108 may also pull information out from that response that was passed back from the virtual compute system 110. The response handler 108 can extract a portion (e.g., the payload) of the response received from the virtual compute system 110 and place the extracted portion into the response provided back to the user. In some embodiments, the extracted portion is transformed into a format that is suitable for the particular response back to the user.

Examples Errors in Virtual Compute System

As described above, the virtual compute system 110 may cause the error by the mishandling of the request or the program code that is otherwise error-free. For example, the program code (e.g., written in Java or Node.js) running inside the virtual compute system 110 (e.g., one of the containers created by the virtual compute system 110) may throw an uncaught top-level exception. In such a case, the response handler 108 may extract the exception and generate, based on the extracted exception, an error code that can be included in the response sent back to the user. For example, the response handler 108 may be configured to shape the response back to the user in one way for out of memory exceptions, but configured to shape the response in another way for stack overflow exceptions. In another example, the amount of computing resources specified by the virtual compute system 110 for executing the program code may turn out to be insufficient. For example, during execution, the program code may exceed the amount of allocated resources (e.g., disk, memory, processing power, etc.).

Response-Dependent API Calls

In some embodiments, the endpoint management system 106 may, based on the response received from the virtual compute system 110 or other systems in the computing environment 100 (e.g., backend system(s) 114), identify the characteristics of the received response, determine whether the destination where the result of the call is to be sent is adapted to handle results of this type. If the endpoint management system 106 determines that the destination (e.g., user computing device 102, or other components in the computing environment 100) is adapted to handle the results of this type (e.g., the result is in the format in which the destination system expects the results to be), the endpoint management system 106 may pass on the results without further processing the results. On the other hand, the endpoint management system 106 may process the results to transform the results into the format expected by the destination system. In some embodiments, the user (or system) who initiated the original request may specify (e.g., via a user interface provided by the endpoint management system 106) the details of the transform. For example, the user may have specified to the endpoint management system 106 how to transform the response from Format A to Format B.

In some embodiments, the endpoint management system 106 may have multiple ways of completing the received request, and all of those ways may be parallel and equivalent. In such embodiments, the endpoint management system 106 may try the different ways (e.g., by initiating a request corresponding to each of such ways) in parallel or in sequence, and return the first and/or fastest result to the sender of the request. For example, if the endpoint management system 106 has access to a storage service that includes many different repositories, the endpoint management system 106 may query multiple repositories in parallel for an answer, and the first repository that sends back a response to the endpoint management system 106 will be chosen and the endpoint management system 106 will forwarded the results of that repository back to the original caller.

In another example, the endpoint management system 106 may have access to an old customer system and a new customer system. The old customer system contains customer data associated with customers who became customers 5 years ago. Customer data associated with customers who became customers within the last 5 years is stored in the newer customer system. When the endpoint management system 106 receives a request, the endpoint management system 106 may not know whether the request is related to the old customer system or the new customer system. In such a case, the endpoint management system 106 can send a request to both places in parallel or in sequence (e.g., try the old system first, and then the new system if the old system fails or does not return a proper response).

Simple Pass-Through

In some embodiments, the endpoint management system 106 does not perform any transformation on the result returned by the virtual compute system 110. For example, the developer may be happy to have the data that comes back from the backend system, and leave it in its raw form. In one example, a picture that is uploaded on a storage system may trigger an event to be generated. The event may cause the virtual compute system to execute a program code associated with the event. The program code may, upon execution, cause the virtual compute system to go download the picture that was uploaded to the storage service and transform the picture into a different size and save it back to the storage service. Based on this functionality, the developer may wish to make this functionality available to external people. So the developer may create a new API (e.g., http://imageresizing123.com/api) and pass in some parameters (e.g., height and width) as part of the API. The information in the payload (e.g., body of the request) may be the binary data of the image. That information would just be passed through untouched. The endpoint management system 106 may determine which program code to have executed based on a mapping between the APIs and the program codes. This information would be sent off to the virtual compute system 110, and the virtual compute system 110 would perform its processing and respond back with different binary data (e.g., image of a different size). The endpoint management system 106 process the received response and determine that the API call was successful, and transfer the data back to the caller untouched.

As discussed herein, the identity of the user calling the API may be different from the identity of the user creating, managing, and otherwise associated with the API. In the example above, the former (e.g., first user) may be an end user who desires to resize pictures using an API and the latter (e.g., second user) may be a developer who configures such an API with the endpoint management system 106 and/or the virtual compute system 110 makes that API available to the end user. A relationship may be established between the first user and the second user before the first user is allowed to access the API associated with the second user. In some embodiments, the second user may create, manage, or otherwise be associated with a program code (e.g., a cloud function that can be executed on the virtual compute system 110), and make the program code available for use by the first user, either independently or in connection with one of APIs associated with the second user.

In some embodiments, only the first user, but not the second user, may be authorized to directly access or otherwise associated with the endpoint management system 106 and/or the virtual compute system 110. For example, the first user may be a customer of the endpoint management system 106 and/or the virtual compute system 110, and the first user may be able to directly access the services (e.g., API management, API proxy service, provision of compute capacity, etc.) provided by the endpoint management system 106 and/or the virtual compute system 110. On the other hand, the second user may not be a customer of either systems. In such an example, APIs and program codes may be invoked on the endpoint management system 106 and/or the virtual compute system 110 on behalf of the first user, based on a request from the second user who may not be a customer of either the endpoint management system 106 or the virtual compute system 110.

Higher Ordered Functions

In some embodiments, the endpoint management system 106 may take computations, transformations, other functions as arguments. For example, a developer may use the endpoint management system 106 to define an API called "bucket-runner" API. The API would take a collection of names of storage buckets, and the name of a program code that may be executed in the virtual compute system 110. The endpoint management system 106 cause the virtual compute system 110 to in sequence go to each of those storage buckets and run the program code over all the items in the storage bucket. For example, if the specified program code is a picture resizing function, the developer can use the API to perform bulk resizing. Similarly, the developer may use the same API to perform bulk deletion, bulk listing, etc.

The integration of the endpoint management system 106 with the virtual compute system 110 may allow users to create a parallelizable way to search the files in a storage system. For example, different users may have different ideas of the different functions (e.g., searching for hits, collecting search results, sorting search results, etc.) that may be performed on the items in the file system. In such an example, the API defined in the endpoint management system 106 may take four parameters: (i) identity of the storage system, (ii) a search function, (iii) a collect function, and (iv) a sort function. The search function may indicate whether a given entry in the storage system is a match (e.g., based on a comparison to a searched item), the collect function may return a set of values based on a set of keys used for the storage system, and the sort function may return a sorted set of values based on a provided set of values.

In order to avoid unnecessary round trips between the client/device and the server/cloud, the virtual compute system 110 may provide higher-ordered functions through the endpoint management system 106 that compose or choreograph multiple customer functions. For example, the virtual compute system 110 may serialize two or more functions (e.g., perform f( ) and g( ) inside a single program code and return the results), parallelize two or more functions (e.g., perform f( ) and g( ) in parallel, possibly in two separate program codes, and return the results when both functions finish executing), compose two or more functions (e.g., perform g(f( ))), perform iteration (e.g., perform f( ) repeatedly over a set of data), and/or perform aspect-oriented programming (e.g., provide a function that is given the parameters and responses of every normal function to create an automatic but fully customizable logger). In the example of aspect-oriented programming, users may change the logger's behavior but may not able to change when/where the logger is applied or the set of permissions that the logger has.

In some cases, the endpoint management system 106 can retrieve a function (e.g., the logger) that was used in connection with an earlier request and then apply the function to later requests (e.g., to actually log a normal function invocation) without requiring either function to be predetermined or fixed by the endpoint management system 106.

IoT Devices

In some embodiments, the endpoint management system 106 provides to the user computing devices 102 a more convenient access to the backend system(s) 114 or other systems or devices. In some of such embodiments, the endpoint management system 106 may communicate with an IoT device with device-specific protocols. For example, the IoT device may have a temperature sensor, and the user can request temperature information from the IoT device. In another example, the IoT device may be a thermostat and the user may be able to cause it to set the temperature to a given temperature. Depending on what the device is, it can have different capabilities. All those capabilities may be managed by some type of API (e.g., backend API) that would exist for manipulating the capability. The endpoint management system 106 may perform the necessary protocol translation and/or data manipulation to allow users to seamlessly communicate with such IoT devices without having to worry about device-specific protocols or requirements. For example, the endpoint management system 106 may query the IoT devices for data or send commands to the IoT devices. The responses received from those IoT devices may be used to shape the response back to the caller based on the requirements of the caller.

Synchronous Invocation Mode

In some embodiments, where events might be generated from various sources, and that would cause some program code to run, there may not necessarily be anybody listening for an answer back from that code execution. In other embodiments, there may be somebody waiting on the other end, which in this case is the call being made through the endpoint management system 106. For example, a call may come in through an API, and the endpoint management system 106 may send a request to execute a program code based on the call to the virtual compute system 110.

For example, if the program code involves adding two numbers and the API call had two strings instead of two numbers, the endpoint management system 106 may, in some embodiments, generate and send to the virtual compute system 110 a request including the program code and the two strings. The virtual compute system 110 may return an error based on the discrepancy between what the program code is expecting as arguments and the provided arguments.

The error that the program code produces is information regarding how the execution of the program code failed. However, the response that the endpoint management system 106 receives from the virtual compute system 110 may indicate that the request to the virtual compute system 110 was successfully completed (because the virtual compute system 110 actually performed as promised). For example, the virtual compute system 110 processed the code execution request, started the program code running, the program code finished running, and the program code came back with some data (which happens to be error information in this example). The endpoint management system 106 may process this error information (e.g., via the error handler 108) and generate a response to be sent back to the caller. The endpoint management system 106 may use pattern matching to determine what kind of response should be generated.

Pattern Matching

The user may provide pattern matching definitions to the endpoint management system 106 that define what kind of information should be included in the response back to the caller under which circumstances. For example, one of the errors that the virtual compute system 110 may return is "invalid arguments." The pattern matching definition defined by the user may provide that if the response from the virtual compute system 110 contains the string "invalid arguments" in the error message, and the endpoint management system 106 should return a HTTP status code 400, which specifies that the user made an error (e.g., passed on bad arguments). The pattern matching definition may further provide that the string "invalid parameters" should be included in the body of the response.

Virtual Compute System as a Validator

In some embodiments, the endpoint management system 106 uses the virtual compute system 110 as a validator. For example, a backend system 114 (e.g., a legacy system) may simply crash upon being supplied with incorrect arguments or upon encountering other errors, instead of returning a nicely formatted error message. In such an example, the endpoint management system 106, before causing the backend system 114 to execute a given program code, the endpoint management system 106 may first cause the virtual compute system 110 to execute the program code for any errors. In some embodiments, assuming the arguments are determined to be valid, instead of actually performing the operation, the endpoint management system 106 may forward a request to execute the program code to the legacy system knowing that the arguments are valid.

Example Configuration of Response Handler

Figure 2:
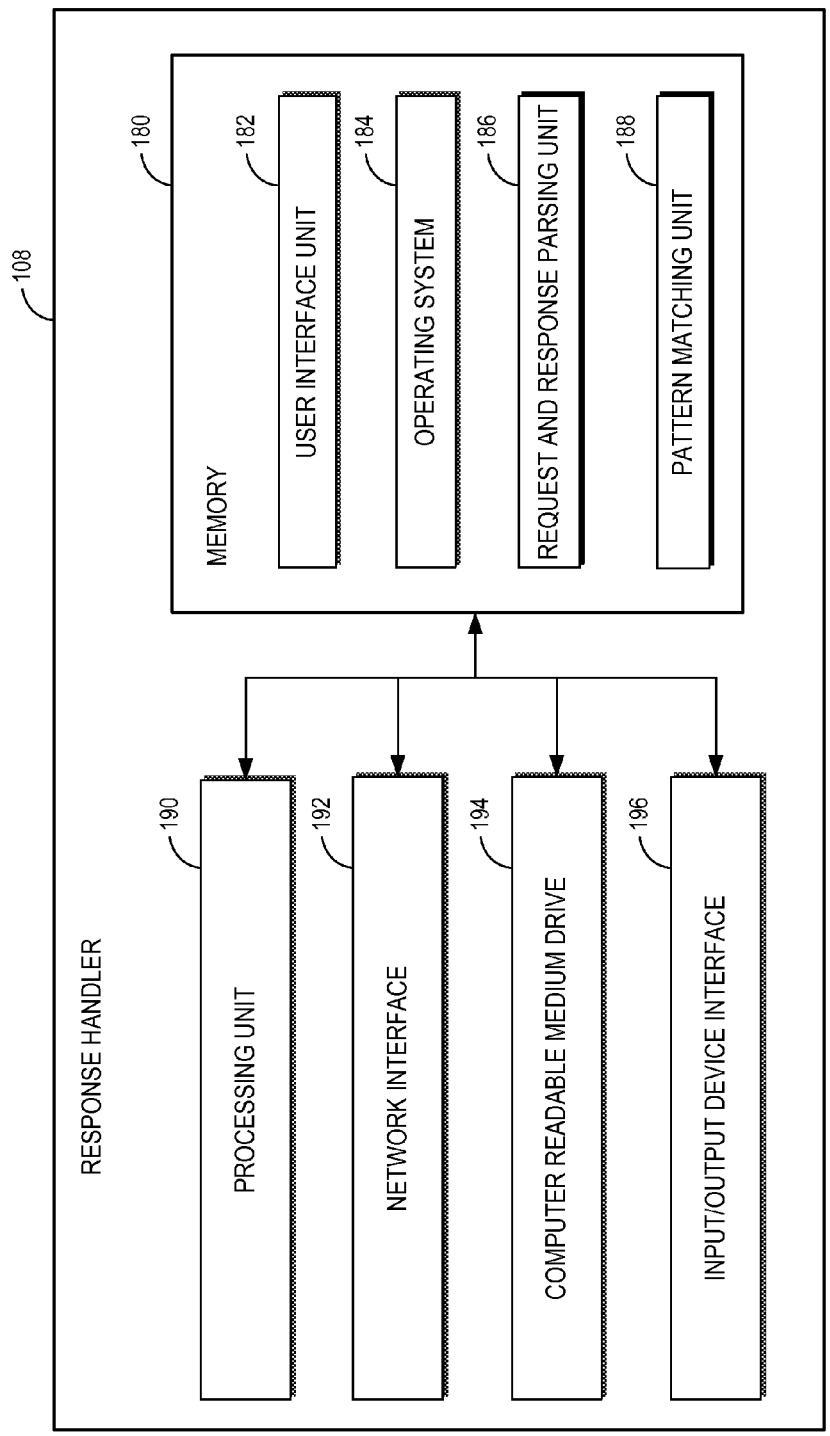
FIG. 2 depicts a general architecture of a computing device providing a response handler for handling the response received from the virtual compute system, according to an example aspect.

FIG. 2 depicts a general architecture of a computing system (referenced as response handler 108) that handles the responses received from other systems in the computing environment 100. The general architecture of the response handler 108 depicted in FIG. 2 includes an arrangement of computer hardware and software modules that may be used to implement aspects of the present disclosure. The response handler 108 may include many more (or fewer) elements than those shown in FIG. 2. It is not necessary, however, that all of these generally conventional elements be shown in order to provide an enabling disclosure. As illustrated, the response handler 108 includes a processing unit 190, a network interface 192, a computer readable medium drive 194, an input/output device interface 196, all of which may communicate with one another by way of a communication bus. The network interface 192 may provide connectivity to one or more networks or computing systems. The processing unit 190 may thus receive information and instructions from other computing systems or services via the network 104A and/or 104B. The processing unit 190 may also communicate to and from the memory 180 and further provide output information for an optional display (not shown) via the input/output device interface 196. The input/output device interface 196 may also accept input from an optional input device (not shown).

The memory 180 may contain computer program instructions (grouped as modules in some embodiments) that the processing unit 190 executes in order to implement one or more aspects of the present disclosure. The memory 180 generally includes RAM, ROM and/or other persistent, auxiliary or non-transitory computer-readable media. The memory 180 may store an operating system 184 that provides computer program instructions for use by the processing unit 190 in the general administration and operation of the response handler 108. The memory 180 may further include computer program instructions and other information for implementing aspects of the present disclosure. For example, in one embodiment, the memory 180 includes a user interface unit 182 that generates user interfaces (and/or instructions therefor) for display upon a computing device, e.g., via a navigation and/or browsing interface such as a browser or application installed on the computing device. Although the example of FIG. 2 is described in the context of user interfaces, it should be appreciated that one or more embodiments described herein may be implemented using, additionally or alternatively, any CLIs, APIs, or other programmatic interfaces. In addition, the memory 180 may include and/or communicate with one or more data repositories (not shown), for example, to access program codes, pattern matching definitions, and/or libraries.

In addition to and/or in combination with the user interface unit 182, the memory 180 may include a request and response parsing unit 186 and a pattern matching unit 188 that may be executed by the processing unit 190. In one embodiment, the user interface unit 182, request and response parsing unit 186, and pattern matching unit 188 individually or collectively implement various aspects of the present disclosure, e.g., parsing the response received from other systems of the computing environment 100, performing a pattern matching based on pattern matching definitions accessible by the endpoint management system 106, generating a response back to the original user initiating the request, etc. as described herein.

The request and response parsing unit 186 processes the response received from other systems in the computing environment 100 (e.g., virtual compute system 110), and extracts information embedded in the response. The pattern matching unit 188, based on the information extracted by the request and response parsing unit 186, performs a pattern matching using the definitions previously provided to the endpoint management system 106 by the user.

While the request and response parsing unit 186 and the pattern matching unit 188 are shown in FIG. 2 as part of the response handler 108, in other embodiments, all or a portion of the request and response parsing unit 186 and the pattern matching unit 188 may be implemented by other components of the endpoint management system 106 and/or another computing device. For example, in certain embodiments of the present disclosure, another computing device in communication with the endpoint management system 106 may include several modules or components that operate similarly to the modules and components illustrated as part of the response handler 108.

Example Response Handling Routine #1

Figure 3:
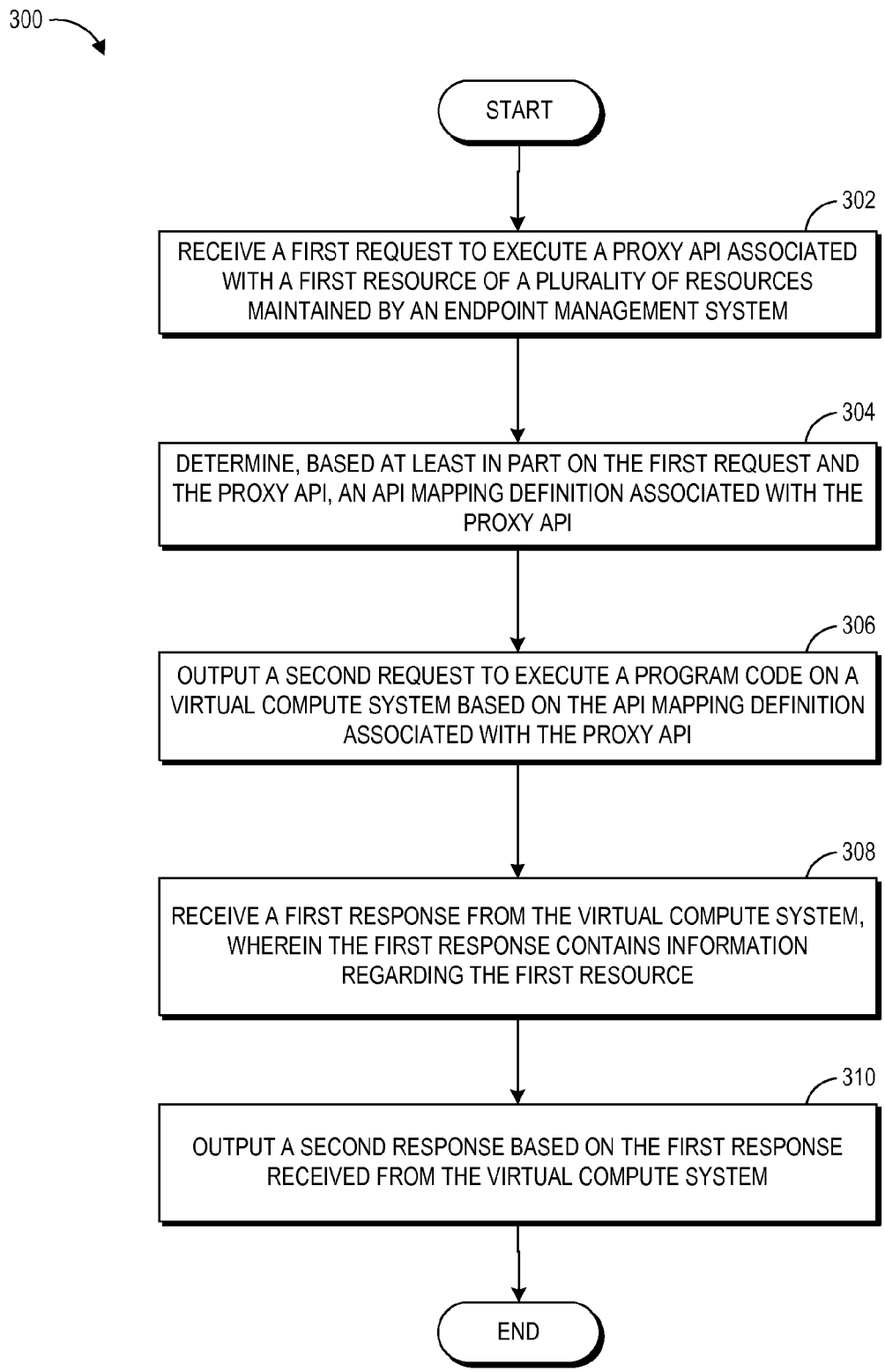
FIG. 3 is a flow diagram illustrating a response handling routine implemented by a response handler, according to an example aspect.

Turning now to FIG. 3, a routine 300 implemented by one or more components of the endpoint management system 106 (e.g., the response handler 108) will be described. Although routine 300 is described with regard to implementation by the endpoint management system 106, one skilled in the relevant art will appreciate that alternative components may implement routine 300 or that one or more of the blocks may be implemented by a different component or in a distributed manner.

At block 302 of the illustrative routine 300, the endpoint management system 106 receives a first request to execute a proxy API associated with a first resource of a plurality of resources maintained by endpoint management system 106. For example, the first request may include an HTTP request that specifies the method and resource combination and one or more other parameters that may be used by the endpoint management system 106 in performing the requested task.

Next, at block 304, the endpoint management system 106 determines, based at least in part on the first request and the proxy API, an API mapping definition associated with the proxy API. For example, the endpoint management system 106 may determine based on the API mapping definition any appropriate data transformations and mappings of the associated input parameters to input parameters for a backend API or other program codes.

At block 306, the endpoint management system 106 outputs a second request to execute a program code on the virtual compute system 110 based on the API mapping definition associated with the proxy API. The virtual compute system 110 may be configured to provide request-based computational capacity and execute program codes in one or more containers created thereon. The second request may contain information associated with the first resource (e.g., identified by a resource identifier), such as one or more parameters included in the first request and/or a program code (or an indication of where the program code is stored). For example, based on the particular resource accessed by the user (e.g., identified using a resource identifier included in the request), the endpoint management system 106 may determine the program code to be used to perform the requested task based on the information available to the endpoint management system 106 (e.g., a database containing a list of program codes that are associated with different combinations of user parameters, requested resources, methods, or any combinations thereof).

At block 308, the endpoint management system 106 receives a first response from the virtual compute system 110. The first response may contain information regarding the first resource and/or the result of executing the program code associated with the first resource. The response may contain information regarding an error that occurred during the execution of the program code associated with the first resource.

At block 310, the endpoint management system 106 outputs a second response based on the first response received from the virtual compute system 110. The endpoint management system 106 may output the second response back to the user who initiated the first request. The second response may include a portion that is identical to another portion of the first response received from the virtual compute system 110. In another example, the endpoint management system 106 processes a portion of the first response and includes the processed portion in the second response.

While the routine 300 of FIG. 3 has been described above with reference to blocks 302-308, the embodiments described herein are not limited as such, and one or more blocks may be omitted, modified, or switched without departing from the spirit of the present disclosure.

Example Response Handling Routine #2

Figure 4:
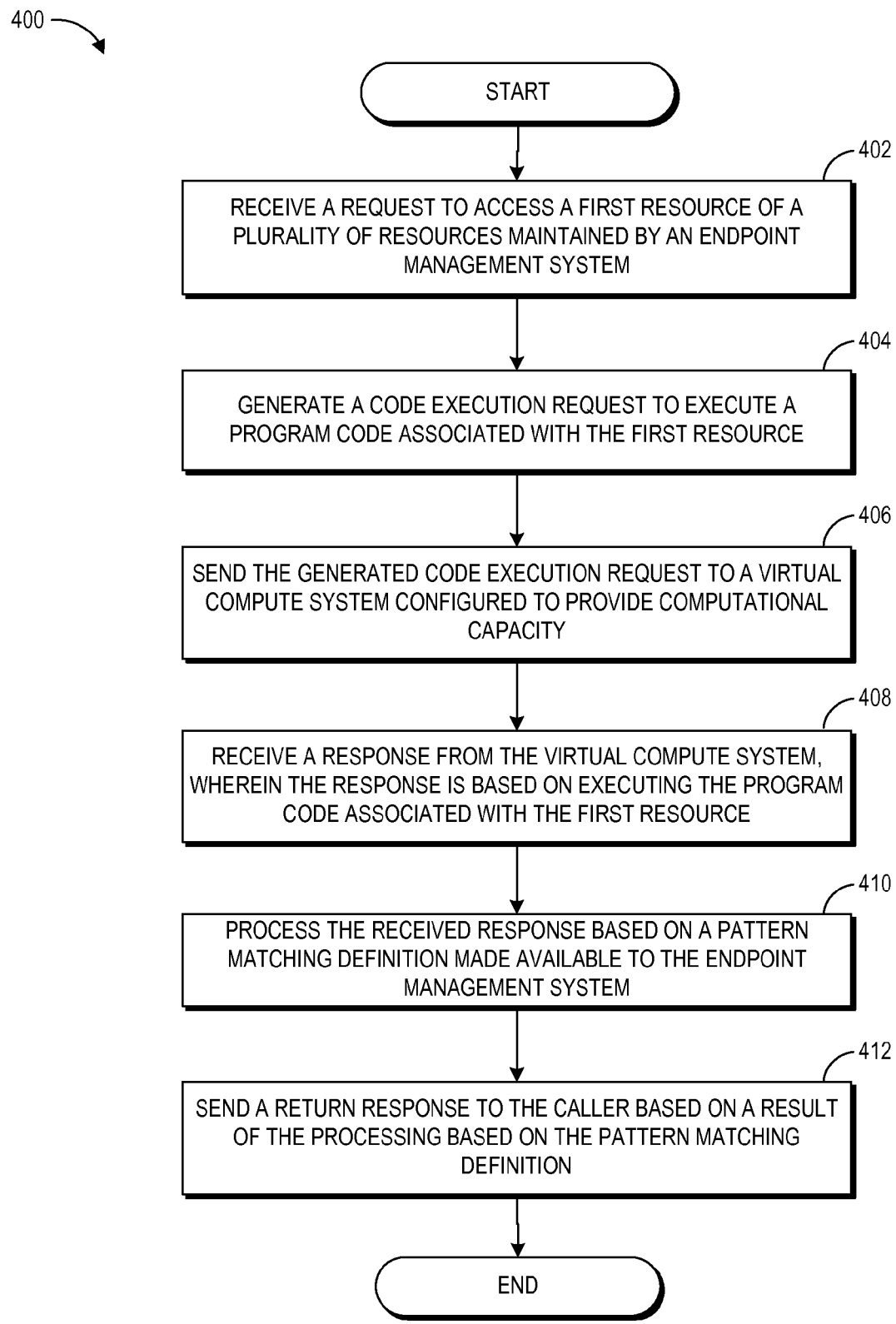
FIG. 4 is a flow diagram illustrating a response handling routine implemented by a response handler, according to another example aspect.

Turning now to FIG. 4, a routine 400 implemented by one or more components of the virtual compute system 110 (e.g., the response handler 108) will be described. Although routine 400 is described with regard to implementation by the endpoint management system 106, one skilled in the relevant art will appreciate that alternative components may implement routine 400 or that one or more of the blocks may be implemented by a different component or in a distributed manner.

At block 402 of the illustrative routine 400, the endpoint management system 106 receives from a caller a request to access a first resource of a plurality of resources maintained by the endpoint management system 106. The request may contain one or more request parameters and a uniform resource identifier (URI) associated with the first resource. The URI may identify a program code to be executed in connection with completing the request, and the request parameters may identify the arguments with which the program code is to be executed.

Next, at block 404, the endpoint management system 106 generates a code execution request to execute the program code associated with the first resource. The code execution request may contain information identifying the program code and information that indicates the identity of the caller. In some embodiments, the code execution request may indicate, additionally or alternatively, that the request is being sent by the endpoint management system 106 and/or that the program code is associated with a particular user of the endpoint management system 106 different from the caller.

At block 406, the endpoint management system 106 sends the generated code execution request to the virtual compute system 110 to cause the virtual compute system 110 to execute the program code identified by the code execution request.

At block 408, the endpoint management system 106 receives a response from the virtual compute system, wherein the response is based on executing the program code associated with the first resource.

At block 410, the endpoint management system 106 processes the received response based on a pattern matching definition made available (e.g., by a user of the endpoint management system 106 who defined the API associated with the first resource) to the endpoint management system prior to the receipt of the request to access the first resource. The pattern matching definition may include a plurality of conditional checks configured to determine whether a corresponding plurality of strings are contained in the received response.

At block 412, the endpoint management system 106 sends a return response to the caller based on a result of the processing based on the pattern matching definition.

While the routine 400 of FIG. 4 has been described above with reference to blocks 402-412, the embodiments described herein are not limited as such, and one or more blocks may be omitted, modified, or switched without departing from the spirit of the present disclosure.

Figure 5:
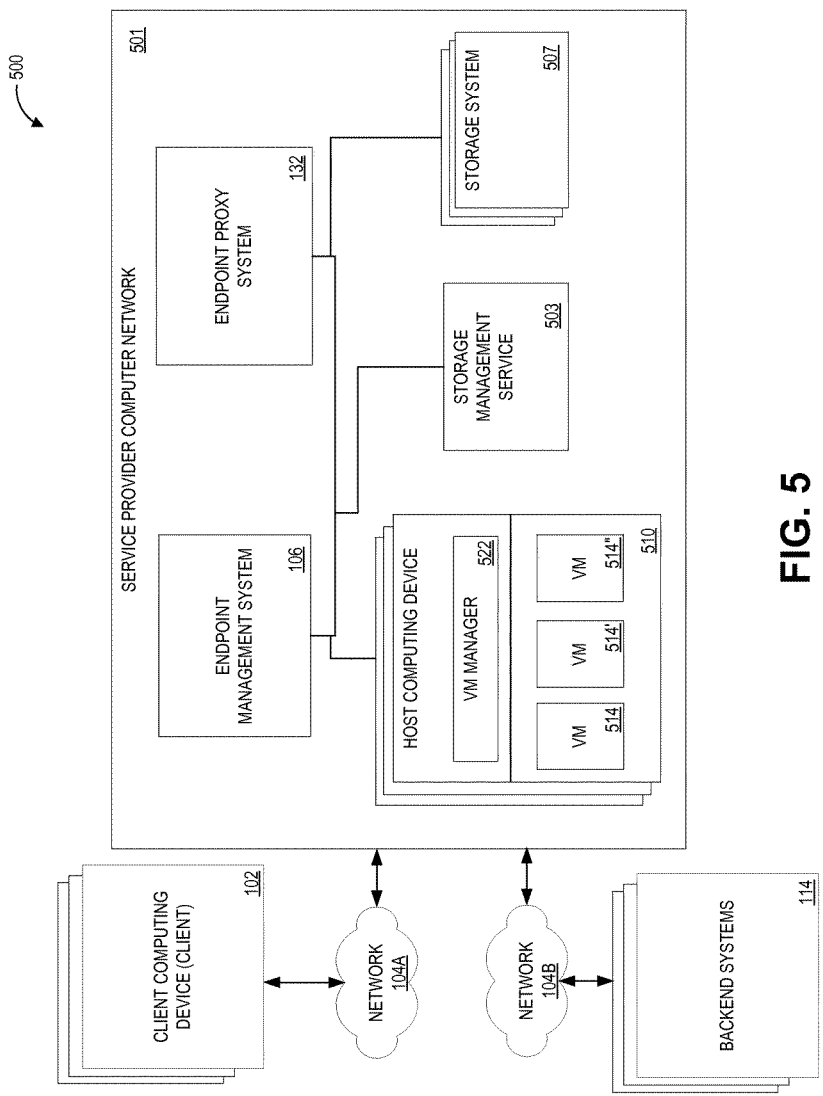
FIG. 5 is a block diagram illustrating an embodiment of a networked computing environment including a client computing device and a service provider computer network.

FIG. 5 is a block diagram illustrating an embodiment of a networked computing environment 500 including one or more client computing devices ("clients") 102 in communication with a service provider computer network 501 through a communication networks 104A and/or 104B. The networked computing environment 500 may include different components, a greater or fewer number of components, and can be structured differently. For example, there can be more than one service provider computer networks 501 so that hosting services or data storage services can be implemented across the multiple service provider computer networks 501 based, for example, on established protocols or agreements. As another example, the service provider computer network 501 may include more or fewer components and some components may communicate with one another through the communication networks 104A and/or 104B.

Illustratively, the client 102 can be utilized by a customer of the service provider computer network 501. In an illustrative embodiment, the client 102 includes necessary hardware and software components for establishing communications with various components of the service provider computer network 501 over the communication networks 104A and/or 104B, such as a wide area network or local area network. For example, the client 102 may be equipped with networking equipment and browser software applications that facilitate communications via the Internet or an intranet. The client 102 may have varied local computing resources such as central processing units and architectures, memory, mass storage, graphics processing units, communication network availability and bandwidth, etc. In one embodiment, the client 102 may have access to or control over a virtual machine instance hosted by the service provider computer network 501. The client 102 may also have access to data storage resources provided by the service provider computer network 501.

With continued reference to FIG. 5, according to one illustrative embodiment, the service provider computer network 501 may include interconnected components such as the endpoint management system 106, endpoint proxy system 132, one or more host computing devices 510, a storage management service 503, and one or more storage systems 507, having a logical association of one or more data centers associated with one or more service providers. The endpoint management system 106 may be implemented by one or more computing devices. For example, the endpoint management system 106 may be implemented by computing devices that include one or more processors to execute one or more instructions, memory, and communication devices to communicate with one or more clients 102 or other components of the service provider computer network 501. In some embodiments, the endpoint management system 106 is implemented on one or more servers capable of communicating over a network. In other embodiments, the endpoint management system 106 is implemented by one or more virtual machines in a hosted computing environment. Illustratively, the endpoint management system 106 can proxy API management and configuration and other relevant functionalities disclosed herein.

The endpoint proxy system 132 may also be implemented by one or more computing devices. In some embodiments, the endpoint proxy system 132 is implemented on one or more computing devices capable of communicating over a network. In other embodiments, the endpoint proxy system 132 is implemented by one or more virtual machines instances in a hosted computing environment. The endpoint proxy system 132 may receive and respond to electronic requests to execute proxy APIs and communicate with backend systems 114 as described herein.

Each host computing device 510 may be a physical computing device hosting one or more virtual machine instances 514. The host computing device 510 may host a virtual machine instance 114 by executing a software virtual machine manager 122, such as a hypervisor, that manages the virtual machine instance 114. The virtual machine instance 114 may execute an instance of an operating system and application software.

In some embodiments, host computing devices 510 may be associated with private network addresses, such as IP addresses, within the service provider computer network 501 such that they may not be directly accessible by clients 102. The virtual machine instances, as facilitated by the virtual machine manager 122 and endpoint management system 106, may be associated with public network addresses that may be made available by a gateway at the edge of the service provider computer network 501. Accordingly, the virtual machine instances 514 may be directly addressable by a client 102 via the public network addresses. One skilled in the relevant art will appreciate that each host computing device 510 would include other physical computing device resources and software to execute multiple virtual machine instances or to dynamically instantiate virtual machine instances. Such instantiations can be based on a specific request, such as a request from a client 102.

The storage management service 503 can be associated with one or more storage systems 507. The storage systems 507 may be servers used for storing data generated or utilized by virtual machine instances or otherwise provided by clients. Illustratively, the storage management service 503 can logically organize and maintain data in data storage volumes. For example, the storage management service 503 may perform or facilitate storage space allocation, input/output operations, metadata management, or other functionalities with respect to volumes.

In some embodiments, a volume may be distributed across multiple storage systems, may be replicated for performance purposes on storage systems in different network areas. The storage systems may be attached to different power sources or cooling systems, may be located in different rooms of a datacenter or in different datacenters, or may be attached to different routers or network switches.

In an illustrative embodiment, host computing devices 510 or storage systems 507 are considered to be logically grouped, regardless of whether the components, or portions of the components, are physically separate. For example, a service provider computer network 501 may maintain separate locations for providing the host and storage components. Additionally, the host computing devices 510 can be geographically distributed in a manner to best serve various demographics of its users. One skilled in the relevant art will appreciate that the service provider computer network 501 can be associated with various additional computing resources, such additional computing devices for administration of content and resources, and the like.

Other Considerations

It will be appreciated by those skilled in the art and others that all of the functions described in this disclosure may be embodied in software executed by one or more physical processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storage medium storing the computer executable components such as a CD-ROM, DVD-ROM, or network interface. Further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system adapted to provide low-latency computational capacity from a virtual compute fleet, the system comprising:
   an endpoint management system comprising one or more hardware computing devices adapted to execute specific computer-executable instructions and in communication with a virtual compute system configured to provide low-latency computational capacity, wherein the endpoint management system is configured to at least:
      receive from a caller a request to access a first resource of a plurality of resources maintained by the endpoint management system, wherein the request contains one or more request parameters and a uniform resource identifier (URI) associated with the first resource,
      generate a code execution request to execute a program code associated with the first resource, wherein the code execution request contains information identifying the program code and the caller;
      send the generated code execution request to the virtual compute system to cause the virtual compute system to execute the program code identified by the code execution request;
      receive a response from the virtual compute system, wherein the response is based on executing the program code associated with the first resource;
      process the received response based on a pattern matching definition made available to the endpoint management system prior to the receipt of the request to access the first resource, wherein the pattern matching definition comprises a plurality of conditional checks configured to determine whether a corresponding plurality of strings are contained in the received response; and
      send a return response to the caller based on a result of the processing based on the pattern matching definition.

2. The system of claim 1, wherein the virtual compute system is further configured to:
   maintain a plurality of virtual machine instances on one or more physical computing devices, wherein the plurality of virtual machine instances comprise a warming pool comprising virtual machine instances having one or more software components loaded thereon and waiting to be assigned to a user, and an active pool comprising virtual machine instances currently assigned to one or more users;
   receive a request associated with a caller to execute a program code on the virtual compute system, wherein the program code is defined by a customer of the virtual compute system, wherein the request includes information identifying the program code, the caller initiating the request, and an amount of computing resources to be used for executing the program code;
   select from the warming pool or the active pool a virtual machine instance to execute the program code;
   create a container in the selected virtual machine instance based on the identified amount of computing resources; and
   cause the identified program code to be loaded from an electronic data store in communication with the virtual compute system onto the container and to be executed in the container.

3. The system of claim 1, wherein the endpoint management system is further configured to:
   determine that the received response contains a success string indicating a successful execution of the program code, wherein the success string is searched in the received response as part of one of the plurality of conditional checks;
   transform the success string into an error string that is compatible with the caller, wherein the error string is associated with an execution error during the execution of the program code; and
   generate the return response based on the error string, wherein the return response indicates that the execution of the program code resulted in the execution error.

4. A system, comprising:
   an endpoint management system comprising one or more hardware computing devices adapted to execute specific computer-executable instructions and in communication with an electronic data store configured to store application programming interface (API) mapping definitions and in communication with a virtual compute system configured to provide request-based computational capacity and execute a program code in a container created thereon, wherein the endpoint management system is configured to at least:
receive a first request to execute a proxy API associated with a first resource of a plurality of resources maintained by the endpoint management system;
determine, based at least in part on the first request and the proxy API, an API mapping definition associated with the proxy API;
output a second request to execute a program code on the virtual compute system based on the API mapping definition associated with the proxy API, wherein the second request contains information associated with the first resource;
receive a first response from the virtual compute system, wherein the first response contains information regarding the first resource; and
output a second response based on the first response received from the virtual compute system.

5. The system of claim 4, wherein the first request specifies the program code and a plurality of data storage systems that each store data objects, wherein the endpoint management system is further configured to cause the virtual compute system to execute the program code on each data object stored in the plurality of data storage systems.

6. The system of claim 4, wherein the endpoint management system is further configured to process the first response using a pattern matching definition stored in the endpoint management system to access the first resource, wherein the pattern matching definition comprises a plurality of conditional checks configured to determine whether a corresponding plurality of strings are contained in the first response.

7. The system of claim 6, wherein the endpoint management system is further configured to:
determine, based on the processing of the first, response using the pattern matching definition, that the first response is free of errors; and
in response to a determination that the first response is free of errors, output a third request to a backend system, wherein the third request contains information associated with the program code to be executed by the backend system.

8. The system of claim 6, wherein the endpoint management system if further configured to:
determine that the first response contains a success string indicating a successful execution of the program code by the virtual compute system, wherein the success string is searched in the first response as part of one of the plurality of conditional checks;
transform the success string into an error string that is compatible with a caller initiating the first request, wherein the error string is associated with an execution error during the execution of the program code by the virtual compute system; and
generate the second response based on the error string, wherein the second response indicates that the execution of the program code resulted in the execution error.

9. The system of claim 4, wherein the virtual compute system is further configured to, in response to receiving the second request from the endpoint management system, execute the program code identified by the second request, wherein the first response contains a first portion that is identical to a second portion of the second response, wherein the first and second portions represent data processed during the execution of the program code by the virtual compute system.

10. The system of claim 4, wherein the virtual compute system is further configured to:
maintain a plurality of virtual machine instances on one or more physical computing devices, wherein the plurality of virtual machine instances comprise a warming pool comprising virtual machine instances having one or more software components loaded thereon and waiting to be assigned to a user, and an active pool comprising virtual machine instances currently assigned to one or more users;
receive a request associated with a caller to execute a program code associated with a user on the virtual compute system, wherein the program code is defined by a customer of the virtual compute system, wherein the request includes information identifying the program code, the caller initiating the request, and an amount of computing resources to be used for executing the program code;
select from the warming pool or the active pool a virtual machine instance to execute the program code;
create a container in the selected virtual machine instance based on the identified amount of computing resources; and
cause the identified program code to be loaded from an electronic data store in communication with the virtual compute system onto the container and to be executed in the container.

11. The system of claim 4, wherein the second request contains information identifying at least one of (i) a caller initiating the first request, (ii) a user associated with the program code, or (iii) the endpoint management system.

12. A computer-implemented method, as implemented by one or more computing devices configured with specific executable instructions, comprising:
receiving a first request to execute a proxy application programming interface (API) associated with a first resource of a plurality of resources maintained by an endpoint management system, wherein the endpoint management system comprises one or more hardware computing devices adapted to execute specific computer-executable instructions and is in communication with (i) an electronic data store configured to store API mapping definitions and (ii) a virtual compute system configured to provide request-based computational capacity and execute a program code in a container created thereon;
determining, based at least in part on the first request and the proxy API, an API mapping definition associated with the proxy API;
outputting a second request to execute a program code on the virtual compute system in communication with the endpoint management system, wherein the second request is based on the API mapping definition associated with the proxy API and contains information associated with the first resource;
receiving a first response from the virtual compute system, wherein the first response contains information regarding the first resource; and
outputting a second response based on the first response received from the virtual compute system.

13. The computer-implemented method of claim 12, further comprising causing the virtual compute system to execute the program code on each data object stored in a plurality of data storage systems, wherein the first request specifies the program code and the plurality of data storage systems that each store data objects.

14. The computer-implemented method of claim 12, further comprising processing the first response using a pattern matching definition stored in the endpoint management system to access the first resource, wherein the pattern matching definition comprises a plurality of conditional checks configured to determine whether a corresponding plurality of strings are contained in the first response.

15. The computer-implemented method of claim 14, further comprising:
   determining, based on the processing of the first response using the pattern matching definition, that the first response is free of errors; and
   in response to a determination that the first response is free of errors, outputting a third request to a backend system, wherein the third request contains information associated with the program code to be executed by the backend system.

16. The computer-implemented method of claim 14, further comprising:
   determining that the first response contains a success string indicating a successful execution of the program code by the virtual compute system, wherein the success string is searched in the first response as part of one of the plurality of conditional checks;
   transforming the success string into an error string that is compatible with a caller initiating the first request, wherein the error string is associated with an execution error during the execution of the program code by the virtual compute system; and
   generating the second response based on the error string, wherein the second response indicates that the execution of the program code resulted in the execution error.

17. A computer-readable, non-transitory storage medium storing computer executable instructions that, when executed by one or more computing devices, configure the one or more computing devices to perform operations comprising:
   receiving a first request to execute a proxy application programming interface (API) associated with a first resource of a plurality of resources maintained by an endpoint management system, wherein the endpoint management system comprises one or more hardware computing devices adapted to execute specific computer-executable instructions and is in communication with (i) an electronic data store configured to store API mapping definitions and (ii) a virtual compute system configured to provide request-based computational capacity and execute a program code in a container created thereon;
   determining, based at least in part on the first request and the proxy API, an API mapping definition associated with the proxy API;
   outputting a second request to execute a program code on the virtual compute system in communication with the endpoint management system, wherein the second request is based on the API mapping definition associated with the proxy API and contains information associated with the first resource;
   receiving a first response from the virtual compute system, wherein the first response contains information regarding the first resource; and
   outputting a second response based on the first response received from the virtual compute system.

18. The computer-readable, non-transitory storage medium of claim 17, wherein the operations further comprise causing the virtual compute system to execute the program code on each data object stored in a plurality of data storage systems, wherein the first request specifies the program code and the plurality of data storage systems that each store data objects.

19. The computer-readable, non-transitory storage medium of claim 18, wherein the operations further comprise providing a result of the execution of the program code to a second program code, wherein the program code is supplied by the second request and the second program code is supplied by a request different from the second request.

20. The computer-readable, non-transitory storage medium of claim 17, wherein the operations further comprise processing the first response using a pattern matching definition stored in the endpoint management system to access the first resource, wherein the pattern matching definition comprises a plurality of conditional checks configured to determine whether a corresponding plurality of strings are contained in the first response.

21. The computer-readable, non-transitory storage medium of claim 20, wherein the operations further comprise:
   determining, based on the processing of the first response using the pattern matching definition, that the first response is free of errors; and
   in response to a determination that the first response is free of errors, outputting a third request to a backend system, wherein the third request contains information associated with a program code to be executed by the backend system.

22. The computer-readable, non-transitory storage medium of claim 20, wherein the operations further comprise:
   determining that the first response contains a success string indicating a successful execution of the program code by the virtual compute system, wherein the success string is searched in the first response as part of one of the plurality of conditional checks;
   transforming the success string into an error string that is compatible with a caller initiating the first request, wherein the error string is associated with an execution error during the execution of the program code by the virtual compute system; and
   generating the second response based on the error string, wherein the second response indicates that the execution of the program code resulted in the execution error.

* * * * *